(12) United States Patent
Frosell et al.

(10) Patent No.: US 9,797,238 B2
(45) Date of Patent: Oct. 24, 2017

(54) MAGNETIC TOOL POSITION DETERMINATION IN A WELLBORE

(71) Applicant: Halliburton Energy Services, Inc., Houston, TX (US)

(72) Inventors: Thomas J. Frosell, Irving, TX (US); Michael L. Fripp, Carrollton, TX (US); Zachary R. Murphree, Dallas, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 60 days.

(21) Appl. No.: 14/647,058

(22) PCT Filed: Dec. 31, 2013

(86) PCT No.: PCT/US2013/078498
§ 371 (c)(1),
(2) Date: May 22, 2015

(87) PCT Pub. No.: WO2015/102622
PCT Pub. Date: Jul. 9, 2015

(65) Prior Publication Data
US 2016/0047228 A1   Feb. 18, 2016

(51) Int. Cl.
*E21B 47/09* (2012.01)
*E21B 47/024* (2006.01)
(Continued)

(52) U.S. Cl.
CPC ........ *E21B 47/0905* (2013.01); *E21B 47/024* (2013.01); *G01V 3/081* (2013.01); *G01V 3/38* (2013.01)

(58) Field of Classification Search
None
See application file for complete search history.

(56) References Cited

U.S. PATENT DOCUMENTS

| | | | |
|---|---|---|---|
| 2008/0294344 A1 | 11/2008 | Sugiura | |
| 2012/0205154 A1* | 8/2012 | Lozinsky | E21B 47/024 175/45 |
| 2016/0145999 A1* | 5/2016 | Clarkson | G01V 3/10 340/854.6 |

OTHER PUBLICATIONS

International Search Report and the Written Opinion of the International Searching Authority, or the Declaration, dated Oct. 7, 2014, PCT/US2013/078498, 15 pages, ISA/KR.

* cited by examiner

*Primary Examiner* — Jermele M Hollington
*Assistant Examiner* — Douglas X Rodriguez
(74) *Attorney, Agent, or Firm* — Haynes and Boone, LLP

(57) ABSTRACT

A magnetic system for determining an operating position of a downhole tool. The system includes an array of magnets operable to produce a magnetic field that is operably associated with a stationary component of the downhole tool. A moveable component of the downhole tool has at least first and second positions relative to the stationary component. In the first position, the moveable component has a first degree of interference with the magnetic field. In the second position, the moveable component has a second degree of interference with the magnetic field. A magnetic field detector is operable to be run into the wellbore and moved relative to the downhole tool such that the position of the moveable component relative to the stationary component is determined by detection of a magnetic signature produced by the moveable component and the array of magnets.

18 Claims, 8 Drawing Sheets

(51) Int. Cl.
*G01V 3/08* (2006.01)
*G01V 3/38* (2006.01)

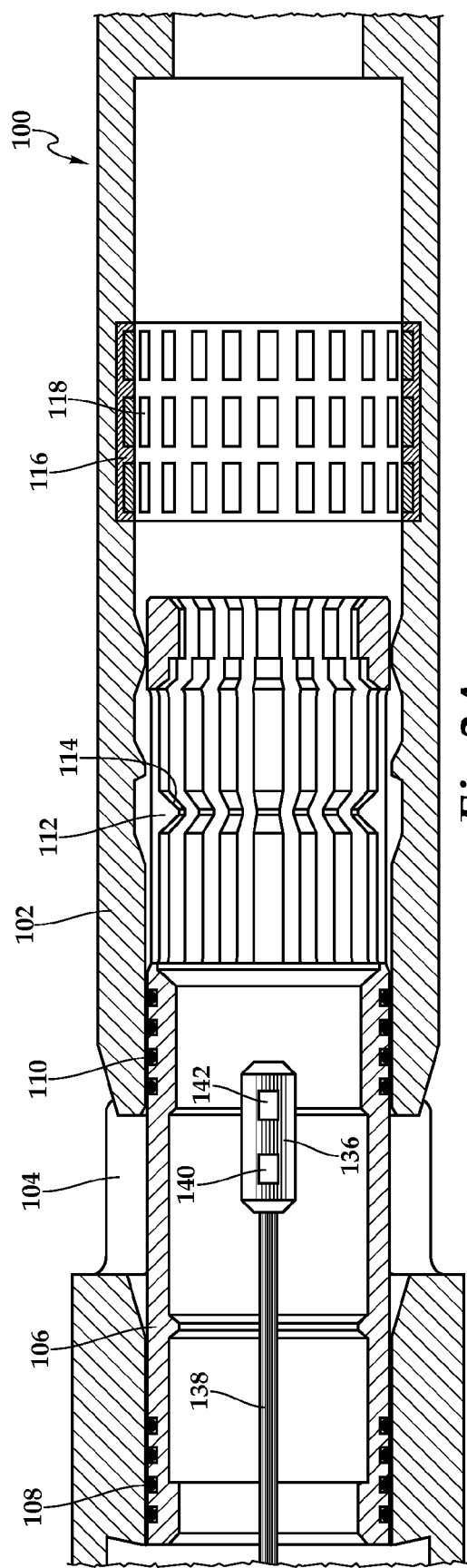
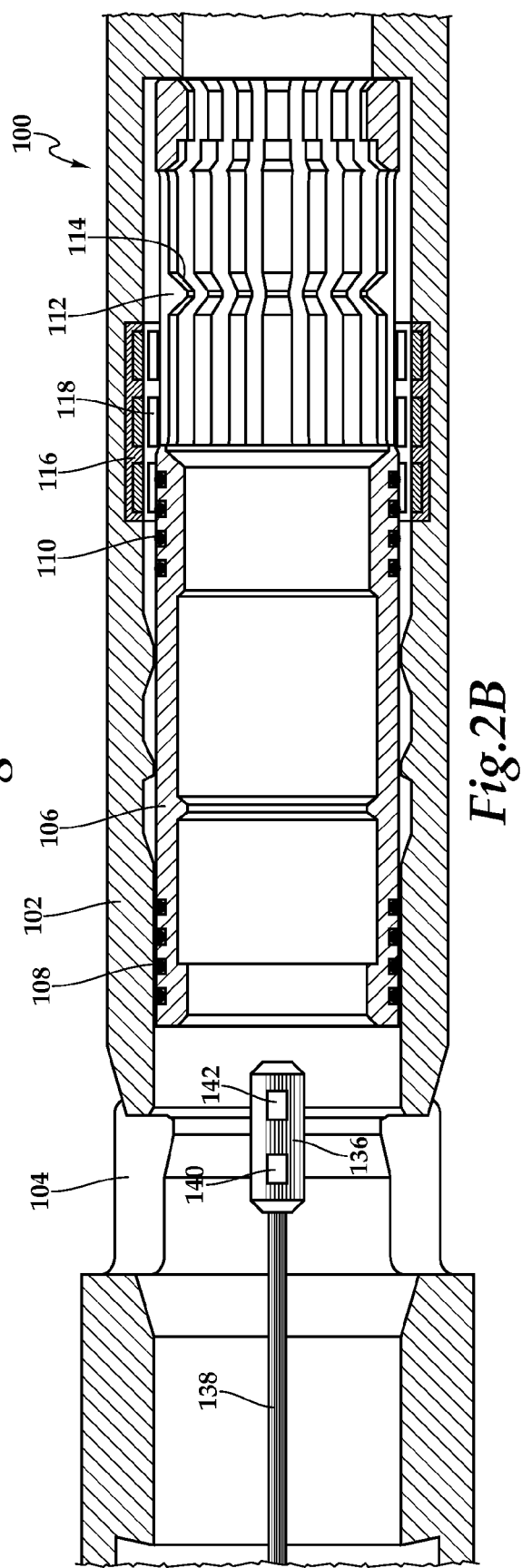
Fig.2A
Fig.2B

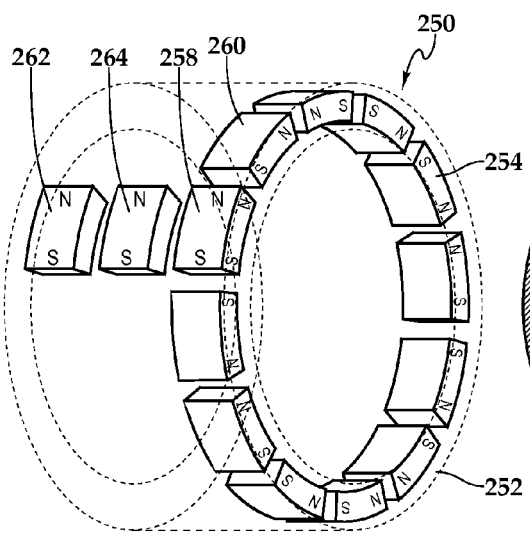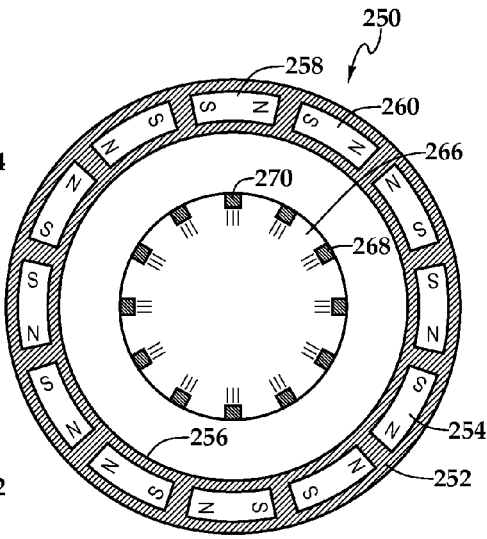
*Fig.5A*  *Fig.5B*
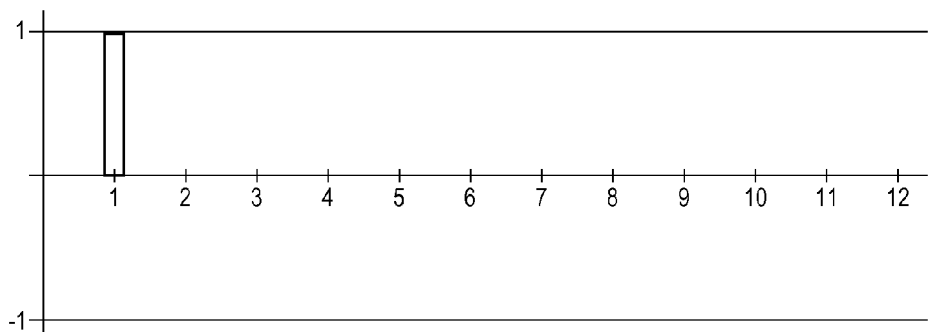
*Fig.5C*
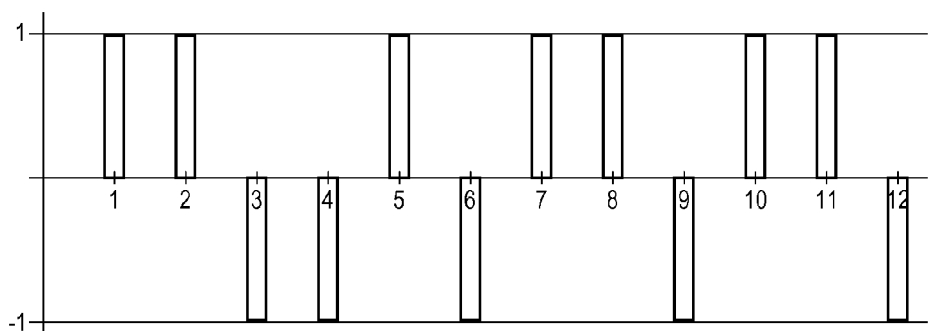
*Fig.5D*

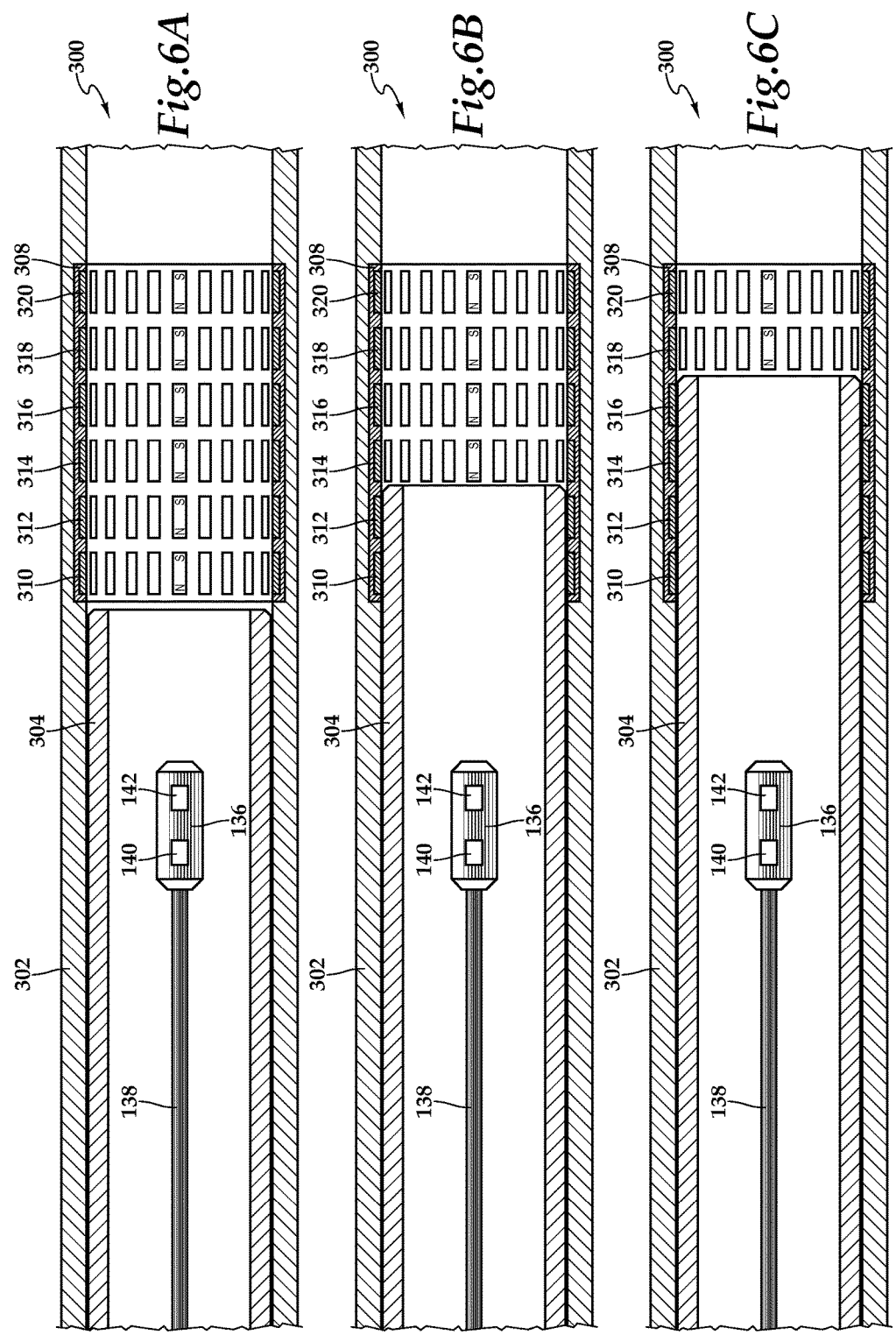

MAGNETIC TOOL POSITION DETERMINATION IN A WELLBORE

The present application is a U.S. National Stage patent application of International Patent Application No. PCT/US2013/078498, filed on Dec. 31, 2013, the benefit of which is claimed and the disclosure of which is incorporated herein by reference in its entirety.

TECHNICAL FIELD OF THE DISCLOSURE

This disclosure relates, in general, to equipment utilized in conjunction with operations performed in relation to subterranean wells and, in particular, to magnetic systems and methods for determining the operating position of a tool in a wellbore.

BACKGROUND

After drilling each section of a subterranean wellbore that traverses one or more hydrocarbon bearing subterranean formations, individual lengths of metal tubulars are typically secured together to form a casing string that is positioned within the wellbore. This casing string provides wellbore stability to counteract the geomechanics of the formation such as compaction forces, seismic forces and tectonic forces, thereby preventing the collapse of the wellbore wall. Conventionally, the casing string is cemented within the wellbore. To produce fluids into the casing string, hydraulic openings or perforations must be made through the casing string and a distance into the formation. Following the perforation process, a production tubing string may be installed within the casing string such that fluid from the producing intervals may be transported to the surface therein.

Various downhole tools, such as tools for fluid flow control, sand control and pressure containment, may also be positioned in the wellbore. For example, such downhole tools may be coupled within the tubing string or may be lowered into the tubing string on a service string or other conveyance. For such downhole tools to perform their intended functions, they must be positioned in the wellbore at the proper depth. As such, knowledge of the precise location of one tubular string within or relative to another tubular string may be necessary when positioning tools downhole. Determination of a true downhole depth measurement, however, may be difficult due to, for example, inaccuracies in a depth reference log, elongation from thermal effects, buckling, stretching or friction effects, or other unpredictable deformations in the length of tubular strings positioned in the wellbore.

After certain downhole tools have been positioned within the wellbore, they may require actuation from a first operating state to a second operating state or require actuation between various operating states. For example, a packer may require actuation from an unset configuration to set configuration, while a fluid flow control device may require actuation between a closed configuration, a fully open configuration and various choking configurations. The actuation process for downhole tools may involve tubing movement, tool movement, application of wellbore pressure, application of fluid flow, dropping of balls on sleeves, hydraulic pressure, electronic means or combinations of the above. Following the actuation process, confirmation of the actuation of the downhole tool may be desirable.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 2A-2B are cross sectional views of a portion of a fluid flow control device in its closed and open positions, respectively, including an array of magnets for use in a magnetic system for determining the operating position of a tool in a wellbore according to an embodiment of the present disclosure;

FIG. 5A is a perspective view, partially in phantom, of a magnetic sleeve for use in a magnetic system for determining the operating position of a tool in a wellbore according to an embodiment of the present disclosure;

FIG. 5B is a cross sectional view of a magnetic sleeve for use in a magnetic system for determining the operating position of a tool in a wellbore according to an embodiment of the present disclosure;

FIGS. 5C-5D are graphs of a magnetic signature obtained using a magnetic system for determining the operating position of a tool in a wellbore according to an embodiment of the present disclosure;

FIGS. 6A-6C are cross sectional views of a portion of a downhole tool in various operating positions, respectively, including an array of magnets for use in a magnetic system for determining the operating position of a tool in a wellbore according to an embodiment of the present disclosure;

DETAILED DESCRIPTION

Figure 1:
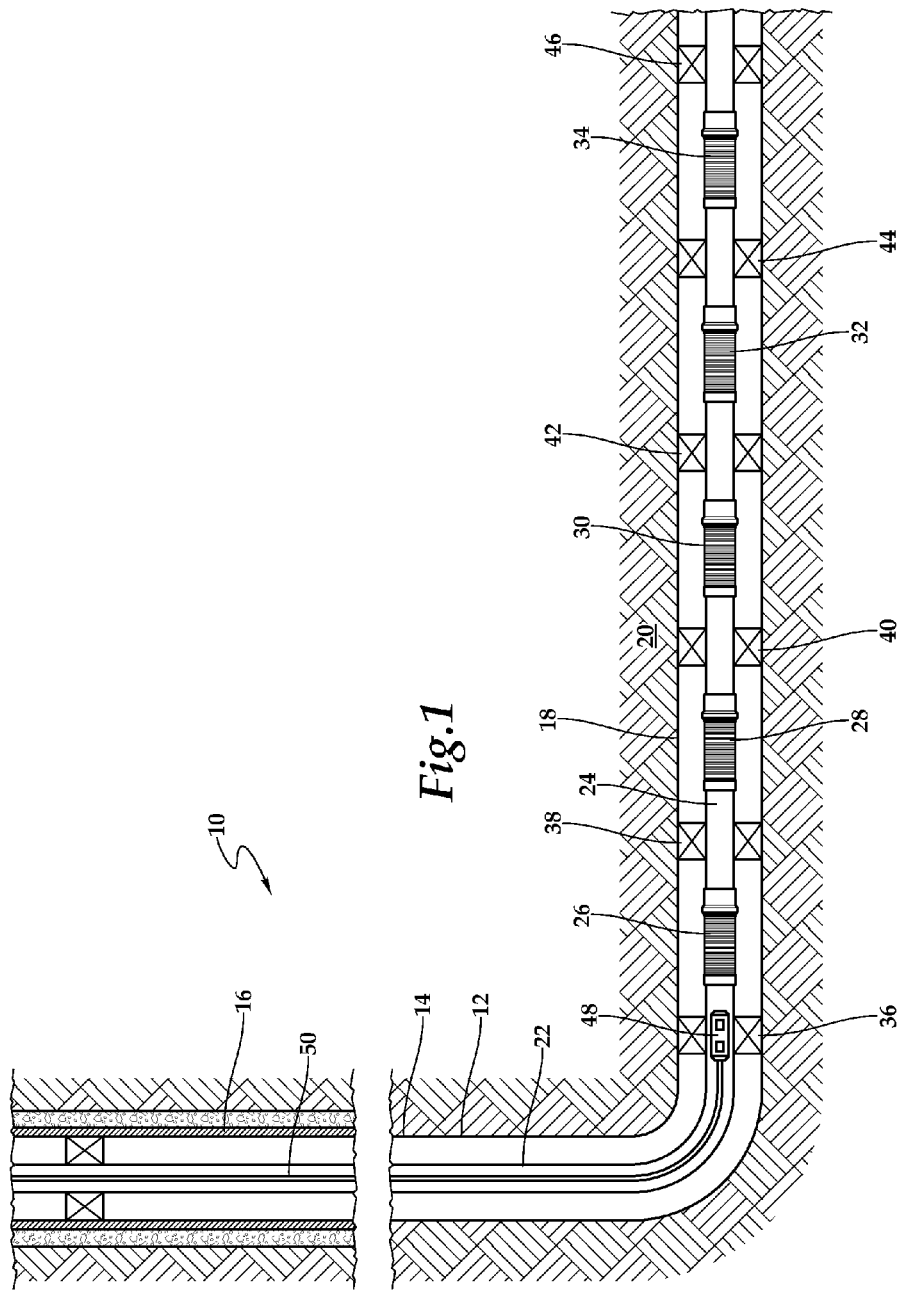
FIG. 1 is a schematic illustration of a well system operating a magnetic system for determining the operating position of a tool in a wellbore according to an embodiment of the present disclosure.

While various system, method and other embodiments are discussed in detail below, it should be appreciated that the present disclosure provides many applicable inventive concepts, which can be embodied in a wide variety of specific contexts. The specific embodiments discussed herein are merely illustrative, and do not delimit the scope of the present disclosure.

In a first aspect, the present disclosure is directed to a magnetic system for determining an operating position of a downhole tool positioned in a wellbore. The system includes an array of magnets operably associated with a stationary component of the downhole tool. The array of magnets is operable to produce a magnetic field. A moveable component of the downhole tool has at least first and second positions relative to the stationary component of the downhole tool. In the first position, the moveable component has a first degree of interference with the magnetic field. In the second position, the moveable component has a second degree of interference with the magnetic field. A magnetic field detector is operable to be run into the wellbore and moved relative to the downhole tool. The position of the moveable component relative to the stationary component is determined by detection of a magnetic signature produced by the moveable component and the array of magnets with the magnetic field detector, thereby determining the operating position of the downhole tool.

In one embodiment, the moveable component moves axially relative to the stationary component. In another embodiment, the moveable component moves circumferentially relative to the stationary component. In some embodiments, the array of magnets may be an axially distributed array of magnets, a circumferentially distributed array of magnets or both. In certain embodiments, the array of magnets may include a digital address identifying array of magnets and a position determining array of magnets. In one such embodiment, the digital address identifying array may be a circumferentially distributed array of magnets having a single axial layer and the position determining array of magnets may be an axially distributed array of magnets. In a particular embodiment, the moveable component may have a plurality of positions relative to the stationary component between the first and second positions such that a different degree of interference with the magnetic field is produced in each of the plurality of positions. In some embodiments, the magnetic field detector may include at least two magnetic field detector elements each operable to detect the magnetic signature produced by the moveable component and the array of magnets.

In a second aspect, the present disclosure is directed to a magnetic method for determining an operating position of a downhole tool positioned in a wellbore. The method includes providing the downhole tool in the wellbore, the downhole tool including a stationary component having an array of magnets operably associated therewith and a moveable component having at least first and second positions relative to the stationary component; producing a magnetic field with the array of magnets; generating a first degree of interference with the magnetic field when the moveable component is in the first position relative to the stationary component; generating a second degree of interference with the magnetic field when the moveable component is in the second position relative to the stationary component; running a magnetic field detector into the wellbore; moving the magnetic field detector through at least a portion of the downhole tool; detecting a magnetic signature produced by the moveable component and the array of magnets with the magnetic field detector; and determining the position of the moveable component relative to the stationary component based upon the magnetic signature.

The method may also include axially shifting the movable component relative to the stationary component; rotatably shifting the movable component relative to the stationary component; producing the magnetic field with an axially distributed array of magnets; producing the magnetic field with a circumferentially distributed array of magnets; producing the magnetic field with an axially and circumferentially distributed array of magnets; identifying a digital address of the downhole tool; detecting a portion of the magnetic signature generated by a circumferentially distributed array of magnets having a single axial layer to identify the digital address; detecting a portion of the magnetic signature generated by an axially distributed array of magnets to determine the position of the moveable component relative to the stationary component; generating a plurality of degrees of interference with the magnetic field when the moveable component is moved to a plurality of positions relative to the stationary component; and/or detecting the magnetic signature with at least two magnetic field detector elements.

FIG. 1 is a schematic illustration of a well system 10 operating a magnetic system for determining the operating position of a tool in a wellbore according to an embodiment of the present disclosure. In the illustrated embodiment, a wellbore 12 extends through the various earth strata. Wellbore 12 has a substantially vertical section 14, the upper portion of which includes a casing string 16 cemented therein. Wellbore 12 also has a substantially horizontal section 18 that extends through a hydrocarbon bearing subterranean formation 20. As illustrated, substantially horizontal section 18 of wellbore 12 is open hole.

Positioned within wellbore 12 and extending from the surface is a tubing string 22. Tubing string 22 provides a conduit for formation fluids to travel from formation 20 to the surface and for injection fluids to travel from the surface to formation 20. At its lower end, tubing string 22 is coupled to a completions string 24 that has been installed in wellbore 12 and divides the completion interval into various production intervals adjacent to formation 20. Completion string 24 includes a plurality of flow control screens 26, 28, 30, 32, 34 each of which is positioned between a pair of annular barriers depicted as packers 36, 38, 40, 42, 44, 46 that provides a fluid seal between completion string 24 and wellbore 12, thereby defining the production intervals. In the illustrated embodiment, flow control screens 26, 28, 30, 32, 34 serve the function of filtering particulate matter out of the production fluid stream. Each flow control screen 26, 28, 30, 32, 34 also has a flow control section that is operable to control fluid flow therethrough including, for example, an inflow control valve having a fully open position, a closed position and a plurality of choking positions therebetween.

In the illustrated completion, it may be desirable to confirm the operating position of a downhole tool such as a flow control section of a flow control screen 26, 28, 30, 32, 34, a setting assembly of a packer 36, 38, 40, 42, 44, 46 or other actuatable tool that includes a movable component that is operable to move between at least two positions relative to a stationary component. In the present disclosure, this is achieved by positioning an array of magnets in the stationary component of the downhole tool such that movement of the moveable component between at least first and second positions relative to the stationary component creates a first degree of interference with the magnetic field produced by the array of magnets in the first position and a second degree of interference with the magnetic field in the second position. Thus, different magnetic signatures are produced based upon the operation position of the downhole tool. In the illustrated embodiment, the magnetic signature may be read by running a magnetic field detector 48 into tubing string 22 and completion string 24 on a service string 50 such as a jointed tubing, a coiled tubing, a wireline, a slickline, a pumpdown tool or other suitable conveyance. Magnetic field detector 48 is then moved through the various downhole tools to detect the respective magnetic signatures produced by the moveable components and the array of magnets of each downhole tool. The magnetic signature information may be sent to the surface using a wired or wireless communication protocol or may be stored in memory associated with magnetic field detector 48. The magnetic signature information is then used to determine the position of the moveable component relative to the stationary component and thereby the operating position of the downhole tool. In certain embodiments, the array of magnets associated with each of the downhole tools may include a digital address such that at least a portion of the detected magnetic signature will include information used to identify the particular downhole tool providing the magnetic signature.

Even though FIG. 1 depicts the disclosed system in an open hole environment, it should be understood by those skilled in the art that the disclosed system is equally well suited for use in cased wells. In addition, even though FIG. 1 depicts the system in a horizontal section of the wellbore, it should be understood by those skilled in the art that the disclosed system is equally well suited for use in wells having other directional configurations including vertical wells, deviated wells, slanted wells, multilateral wells and the like. Accordingly, it should be understood by those skilled in the art that the use of directional terms such as above, below, upper, lower, upward, downward, left, right, uphole, downhole and the like are used in relation to the illustrative embodiments as they are depicted in the figures, the upward direction being toward the top of the corresponding figure and the downward direction being toward the bottom of the corresponding figure, the uphole direction being toward the surface of the well and the downhole direction being toward the toe of the well.

FIGS. 2A-2B are cross sectional views of a portion of a fluid flow control device 100 in its closed and open positions, respectively. Fluid flow control device 100 included an outer housing 102 that may be securably coupled within a tubular string such as completion string 24 discussed above or may be part of another tool such as a flow control screen discussed above. In the illustrated embodiment, outer housing 102 includes one or more ports 104 operable to allow fluid flow between the exterior and interior of fluid flow control device 100. Slidably positioned to the inner diameter of outer housing 102, fluid flow control device 100 includes a sliding sleeve 106. Sliding sleeve 106 includes a plurality of upper seals 108 and a plurality of lower seals 110 that provide a sealing engagement between sliding sleeve 106 and the interior surface of outer housing 102 such that in FIG. 2A, fluid flow through ports 104 is prevented. In the illustrated embodiment, sliding sleeve 106 includes a collet assembly 112 having a profile 114 operable to receive and couple with a mechanical shifting tool (not pictured) that may be used to shift sliding sleeve 106 between the closed position depicted in FIG. 2A and the open position as depicted in FIG. 2B. It should be understood, however, by those skilled in the art that even though a particular actuation process has been described, a fluid flow control device or other actuatable device using the magnetic system of the present disclosure may be actuated by other processes including, but not limited to, tubing movement, tool movement, application of wellbore pressure, application of fluid flow, dropping of balls on sleeves, hydraulic pressure, electronic means, combinations of the above or the like.

Figure 3A:
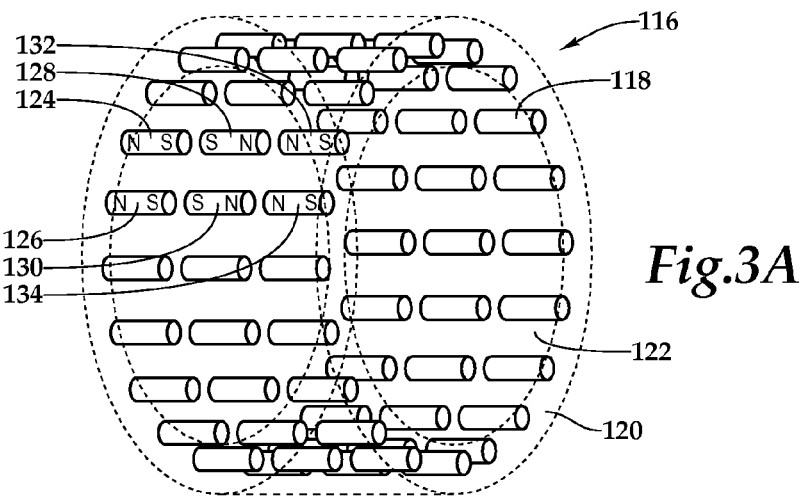
FIG. 3A is a perspective view, partially in phantom, of a magnetic sleeve for use in a magnetic system for determining the operating position of a tool in a wellbore according to an embodiment of the present disclosure.

Positioned within outer housing 102, fluid flow control device 100 includes a magnetic sleeve 116 having an array of magnets 118. As best seen in FIG. 3A, magnetic sleeve 116 has an annular body 120 preferably formed from a non-magnetic material such as metal, plastic, ceramic or other suitable material. Magnets 118 may be disposed entirely within annular body 120 or may have an exposed surface that preferably coincides with the inner diameter 122 of annular body 120. In the illustrated embodiment, array of magnets 118 can be described as having a plurality of circumferentially distributed rows of axially distributed magnets, in this case, twenty circumferentially distributed rows, wherein one circumferential row includes magnets 124, 128, 132 and another circumferential row includes magnets 126, 130, 134. Alternatively or additionally, array of magnets 118 can be described as having a plurality of axial layers of circumferentially distributed magnets, in this case, three axial layers, wherein one axial layer includes magnets 124, 126, another axial layer include magnets 128, 130 and a further axial layer includes magnets 132, 134. As such, array of magnets 118 can be said to include both axially distributed arrays of magnets and circumferentially distributed arrays of magnets. Even though array of magnets 118 has been described as including both axially distributed arrays of magnets and circumferentially distributed arrays of magnets, it should be understood by those skilled in the art that an array of magnets could including only a single ring of magnets which could be described as a single axial layer or a single axial strip of magnets which could be described as a single circumferential row.

Depend upon factors such as the polarity, size, shape, orientation and the material of each magnet, array of magnets 118 will produce a particular magnetic field. The signature of this magnetic field can be detected using, for example, a magnetic field detector 136 that may be run downhole into magnetic communication with the magnetic field on a service string 138, such as a joined tubing, a coiled tubing, a wireline or other conveyance. In the illustrated embodiment, magnetic field detector 136 includes two magnetic field detector elements or sensors 140, 142, each of which is operable to independently detect the signature of the magnetic field. For example, magnetic field detector elements 140, 142 may be Hall-Effect sensors that have an output proportional to the change in flux density of the magnetic field and are sensitive to the polarity of the magnetic field. Alternatively, magnetic field detector elements 128, 130 may be other types of magnetic field sensors including, for example, giant magnetoresistance (GMR) sensors, biased GMR sensors or other suitable magnetic field sensors. Referring again to FIG. 3A, each of the magnets in each of the axial layers of magnets has the same polarity. For example, magnets 124, 126 of the axial layer to the right are oriented as N-S polarity. Similarly, magnets 128, 130 of the axial layer to the center are oriented as S-N polarity. Likewise, magnets 132, 134 of the axial layer to the left are oriented as N-S polarity. Having the magnets oriented in this manner allows for the use of a magnetic field detector having a single magnetic field detector element or multiple magnetic field detector elements located along a single circumferential position on the magnetic field detector such as the depicted magnetic field detector 136.

Figure 3B:
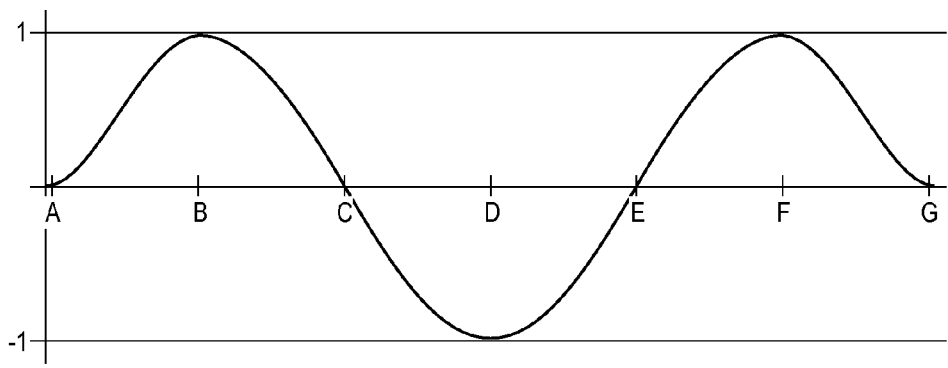
FIGS. 3B-3C are graphs of a magnetic signature obtained using a magnetic system for determining the operating position of a tool in a wellbore according to an embodiment of the present disclosure.

In this configuration of magnets, when magnetic field detector 136 is moved in the downhole direction through the magnetic field generated by array of magnets 118 in FIG. 2A, each of the magnetic field detector elements 140, 142 may detect a magnetic signature similar to that depicted in FIG. 3B. In the graph, the vertical scale represents a magnetic field detector element output and the horizontal scale represents a magnetic field detector element position. Point A represents the position when a magnetic field detector element, such as element 142, first detects the magnetic field generated by a magnet or magnets in the axial layer to the right, such as magnet 124, which represents the magnet that is circumferentially aligned with element 142 as element 142 is moved through the magnetic field. Point B represents the position when element 142 is centered relative to magnet 124. Point C represents the position when element 142 is centered between magnets 124, 128. Point D represents the position when element 142 is centered relative to magnet 128. Point E represents the position when element 142 is centered between magnets 128, 132. Point F represents the position when element 142 is centered relative to magnet 132. Point G represents the position when element 142 is leaving the magnetic field generated by magnet 132. A similar magnetic signature would be detected if magnetic field detector 136 were moved in the uphole direction through the magnetic field generated by array of magnets 118 in FIG. 2A.

After fluid flow control device 100 is operated from the closed position, depicted in FIG. 2A, to the open position, depicted in FIG. 2B, by shifting sliding sleeve 106 relative to outer housing 120, the material of sliding sleeve 106 now interferes with the magnetic field generated by array of magnets 118. Specifically, as best seen in FIG. 2B, a solid portion of sliding sleeve 106 is now covering the axial layer of magnets to the right, which provides partial or total shielding of the magnetic field produced, by these magnets. The magnets of the center and left axial layers are behind a magnetically permeable portion of sliding sleeve 106; namely, collet assembly 112. In the configuration of sliding sleeve 106 and array of magnets 118 depicted in FIG. 2B, when magnetic field detector 136 is moved in the downhole direction through the magnetic field, each of the magnetic field detector elements 140, 142 may detect a magnetic signature similar to that depicted in FIG. 3C. In the graph, the vertical scale represents a magnetic field detector element output and the horizontal scale represents a magnetic field detector element position. Using the convention described above, point A represents the position when element 142 first detects the magnetic field generated by magnet 124. Point B represents the position when element 142 is centered relative to magnet 124. Point C represents the position when element 142 is centered between magnets 124, 128. Point D represents the position when element 142 is centered relative to magnet 128. Point E represents the position when element 142 is centered between magnets 128, 132. Point F represents the position when element 142 is centered relative to magnet 132. Point G represents the position when element 142 is leaving the magnetic field generated by magnet 132. A similar magnetic signature would be detected if magnetic field detector 136 were moved in the uphole direction through the magnetic field generated by array of magnets 118 in FIG. 2B.

Figure 3C:
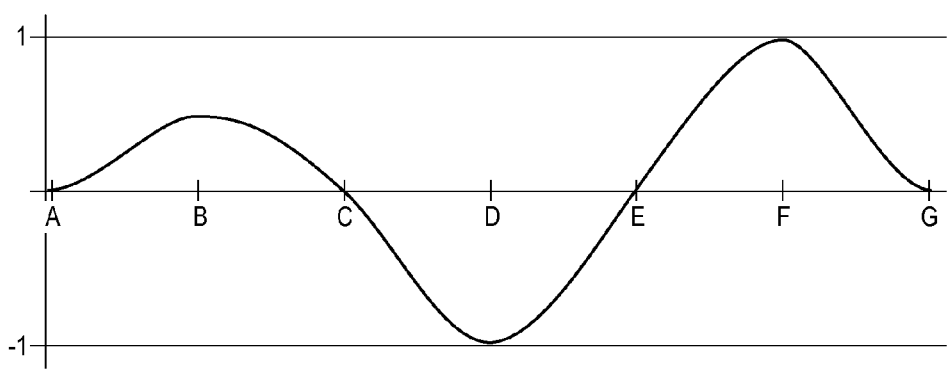

Comparing the detected magnetic signatures depicted in FIGS. 3B and 3C, it can be seen that the strength of the magnetic field created by magnet 124, as well as the other magnets in this axial layer, has been significantly attenuated due to the interference created by the solid portion of sliding sleeve 106, while the strength of the magnetic fields created by magnets 128, 132, as well as the other magnets in these axial layer, has not been significantly changed as collet assembly 112 of sliding sleeve 106 is highly magnetically permeable. As such, in the closed position, sliding sleeve 106 has a first degree of interference with the magnetic field, in this case little or no interference with the entire magnetic field, while in the open position, sliding sleeve 106 has a second degree of interference with the magnetic field, in this case significant interference with the portion of the magnetic field generated by the magnets in the axial layer to the right and little or no interference with the portion of the magnetic field generated by the magnets in the axial layers to the center and left. In this manner, the position of sliding sleeve 106 relative to outer housing 120 and therefore the operating position of fluid flow control device 100 can be determined based upon the detected magnetic signature. It should be noted that if the magnetic field created by magnet 124 is attenuated to a level below the detection threshold of magnetic field detector 136, a zero reading from magnet 124 would serve to indicate that fluid flow control device 100 is in the open position.

Figure 4A:
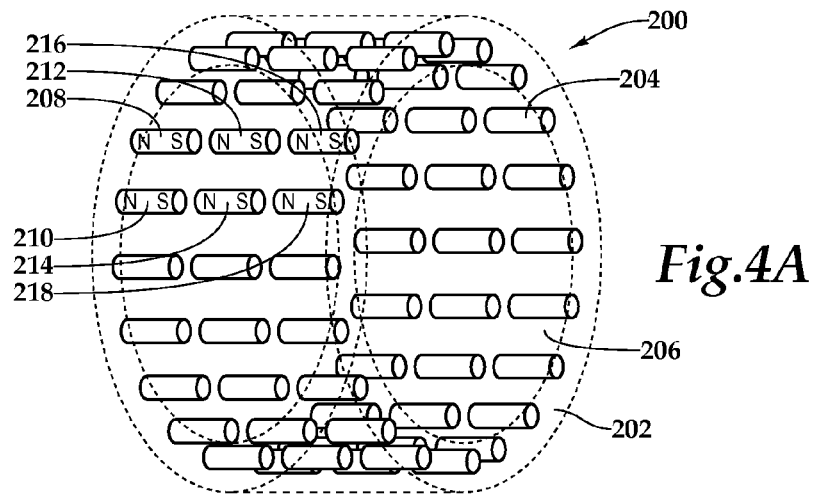
FIG. 4A is a perspective view, partially in phantom, of a magnetic sleeve for use in a magnetic system for determining the operating position of a tool in a wellbore according to an embodiment of the present disclosure.

In addition to providing a determination of the operating position of a downhole tool, the magnetic system of the present disclosure may also provide the identity of the downhole tool in association with the operating position. For example, in the above embodiment, only the axial layer of magnets to the right is required to determine whether fluid flow control device 100 is open or closed. The magnets of the center and left axial layers may then be used to create a unique digital address. As best seen in FIG. 4A, a magnetic sleeve 200 has an annular body 202 preferably formed from a non-magnetic material such as metal, plastic, ceramic or other suitable material. An array of magnets 204 is disposed entirely within annular body 202 or may have an exposed surface that preferably coincides with the inner diameter 206 of annular body 202. In the illustrated embodiment, array of magnets 204 can be described as having a plurality of circumferentially distributed rows of axially distributed magnets, in this case, twenty circumferentially distributed rows, wherein one circumferential row includes magnets 208, 212, 216 and another circumferential row includes magnets 210, 214, 218. Alternatively or additionally, array of magnets 204 can be described as having a plurality of axial layers of circumferentially distributed magnets, in this case, three axial layers, wherein one axial layer includes magnets 208, 210, another axial layer include magnets 212, 214 and a further axial layer includes magnets 216, 218. As such, array of magnets 204 includes both axially distributed arrays of magnets and circumferentially distributed arrays of magnets.

Depend upon factors such as the polarity, size, shape, orientation and the material of each magnet, array of magnets 204 will produce a particular magnetic field. For example, each of the magnets in each of the axial layers of magnets has the same polarity. In this case, magnets 208, 210 of the axial layer to the right are oriented as N-S polarity. Similarly, magnets 212, 214 of the axial layer to the center are oriented as N-S polarity. Likewise, magnets 216, 218 of the axial layer to the left are oriented as N-S polarity. Having the magnets oriented in this manner allows for the use of a magnetic field detector having a single magnetic field detector element or multiple magnetic field detector elements located along a single circumferential position on the magnetic field detector such as the depicted magnetic field detector 136.

Figure 4B:
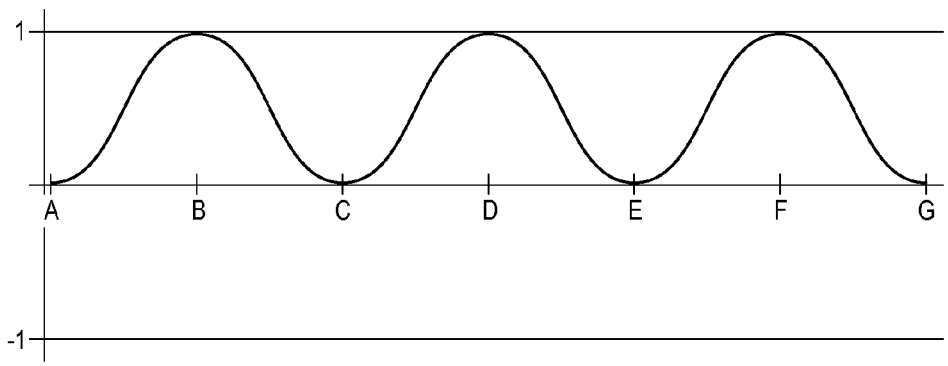
FIGS. 4B-4C are graphs of a magnetic signature obtained using a magnetic system for determining the operating position of a tool in a wellbore according to an embodiment of the present disclosure.

If magnetic sleeve 200 is positioned within a fluid flow control device similar to fluid flow control device 100 in its closed position, when magnetic field detector 136 is moved in the downhole direction through the magnetic field generated by array of magnets 204, each of the magnetic field detector elements 140, 142 may detect a magnetic signature similar to that depicted in FIG. 4B. In the graph, the vertical scale represents a magnetic field detector element output and the horizontal scale represents a magnetic field detector element position. Point A represents the position when element 142 first detects the magnetic field generated by magnet 208. Point B represents the position when element 142 is centered relative to magnet 208. Point C represents the position when element 142 is centered between magnets 208, 212. Point D represents the position when element 142 is centered relative to magnet 212. Point E represents the position when element 142 is centered between magnets 212, 216. Point F represents the position when element 142 is centered relative to magnet 216. Point G represents the position when element 142 is leaving the magnetic field generated by magnet 216. A similar magnetic signature would be detected if magnetic field detector 136 were moved in the uphole direction through the magnetic field generated by array of magnets 204.

Figure 4C:
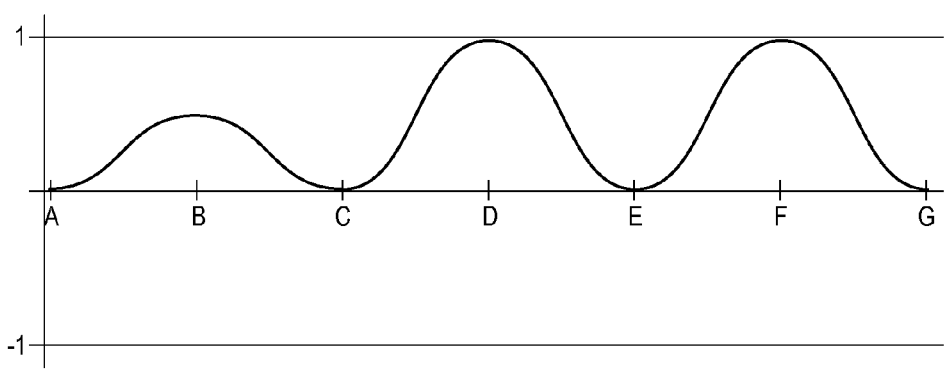

If magnetic sleeve 200 is positioned within a fluid flow control device similar to fluid flow control device 100 in its open position, when magnetic field detector 136 is moved in the downhole direction through the magnetic field, each of the magnetic field detector elements 140, 142 may detect a magnetic signature similar to that depicted in FIG. 4C. In the graph, the vertical scale represents a magnetic field detector element output and the horizontal scale represents a magnetic field detector element position. Point A represents the position when element 142 first detects the magnetic field generated by magnet 208. Point B represents the position when element 142 is centered relative to magnet 208. Point C represents the position when element 142 is centered between magnets 208, 212. Point D represents the position when element 142 is centered relative to magnet 212. Point E represents the position when element 142 is centered between magnets 212, 216. Point F represents the position when element 142 is centered relative to magnet 216. Point G represents the position when element 142 is leaving the magnetic field generated by magnet 216. A similar magnetic signature would be detected if magnetic field detector 136 were moved in the uphole direction through the magnetic field generated by array of magnets 204.

Comparing the detected magnetic signatures depicted in FIGS. 4B and 4C, it can be seen that the strength of the magnetic field created by magnet 208, as well as the other magnets in this axial layer, has been significantly attenuated due to the interference created by the solid portion of sliding sleeve 106, while the strength of the magnetic fields created by magnets 212, 216, as well as the other magnets in these axial layer, has not been significantly changed as collet assembly 112 of sliding sleeve 106 is highly magnetically permeable. As such, the position of sliding sleeve 106 relative to outer housing 120 and therefore the operating position of fluid flow control device 100 can be determined based upon the detected magnetic signature.

In addition, by comparing the detected magnetic signatures depicted in FIGS. 3B and 4B or FIGS. 3C and 4C, it can be seen that the magnets of the center and left axial layers create unique digital addresses. For example, when magnetic field detector 136 is moved in the downhole direction through the magnetic field created by magnetic sleeve 116, a digital address of (−1, 1) is provided. Similarly, when magnetic field detector 136 is moved in the downhole direction through the magnetic field created by magnetic sleeve 200, a digital address of (1, 1) is provided. Using two axial layers of magnets can yield four unique addresses; namely (1, 1), (1, −1), (−1, −1) and (−1, 1). If additional unique addresses are required, additional axial layers of magnets can be added to a magnetic sleeve.

FIG. 5A depicts another embodiment of a magnetic sleeve 250 for use in a magnetic system for determining the operating position of a tool in a wellbore. Magnetic sleeve 250 has an annular body 252 preferably formed from a non-magnetic material such as metal, plastic, ceramic or other suitable material. An array of magnets 254 is disposed entirely within annular body 252 or may have an exposed surface that preferably coincides with the inner diameter 256 of annular body 252. In the illustrated embodiment, array of magnets 254 can be described as having a circumferentially distributed array of magnets, in the case twelve magnets, including magnets 258, 260 and an axially distributed array of magnets, in this case three magnets, including magnets 262, 264, 258. As best seen in FIG. 5B, a magnetic field detector 266 preferably includes at least one circumferentially distributed array of magnetic field detector elements 268 that preferably corresponds in number with the number of magnets in the circumferentially distributed array of magnets, in this case twelve elements 268. In this manner, there is one-to-one correspondence between the magnetic field detector elements 268 and the magnets in the circumferentially distributed array of magnets. It should be understood by those skilled in the art that ratios other than one-to-one between the elements 268 and the magnets in array of magnets 254 are possible and are considered to be within the scope of the present disclosure. In the illustrated embodiment, when magnetic field detector 266 is moved in the downhole direction through the magnetic field generated by array of magnets 254, at least one of the magnetic field detector elements, in this case element 270, may detect a magnetic signature similar to that depicted in FIG. 5C when element 270 first detects the magnetic field. In the graph, the vertical scale represents a magnetic field detector element output and the horizontal scale represents which magnetic field detector element is making the reading. In the illustrated embodiment, element 270 becomes element 1 on the horizontal scale as element 270 was the element to make the reading associated with the axial array of magnets.

If magnetic sleeve 250 is positioned within a fluid flow control device similar to fluid flow control device 100 in its closed position, when magnetic field detector 266 is moved in the downhole direction through the magnetic field, element 1 on the graph which corresponds to element 270 in this example, would detect the magnetic field of magnet 262 followed by the magnetic field of magnet 264, wherein magnet 264 can be considered a reference magnet as discussed below. Both of these readings could be represented by FIG. 5C. Thereafter, each of the magnetic field detector elements 268 would read a magnetic field generated by at least one of the magnets in the circumferential array. These readings could be represented by the graph in FIG. 5D, wherein a S-N polarity registers as (1) and a N-S polarity registers as (−1). Similarly, if magnetic sleeve 250 is positioned within a fluid flow control device similar to fluid flow control device 100 in its open position, when magnetic field detector 266 is moved in the downhole direction through the magnetic field, element 1, may detect an attenuated magnetic field or no magnetic field associated with magnet 262 followed by the magnetic field of magnet 264. As the magnetic field generated by magnet 264 is generally unchanged between the closed position and the open position of fluid flow control device 100, magnet 264 can be considered a reference magnet as its magnetic field will establish which element of the magnetic field detector elements 268 is element 1.

Thereafter, each of the magnetic field detector elements 268 would read a magnetic field generated by at least one of the magnets in the circumferential array. Similar to the determination of tool position described above, in the present example, the detected portion of the magnetic signature generated by magnet 262 will be used to determine the operating position of fluid flow control device 100. The detected portion of the magnetic signature generated by the circumferential array is then used to identify the downhole tool by unique address. Using twelve magnets in the circumferential array and twelve detector elements yields 4,096 unique addresses. Alternatively, instead of using a circumferential array of detector elements, a magnetic field detector having a single magnetic field detector element or multiple magnetic field detector elements located along a single circumferential position on the magnetic field detector such as magnetic field detector 136 could be used to read the portion of the magnetic signature generated by the circumferential array, if the field detector elements and/or the entire magnetic field detector are rotatable relative to the magnetic field.

FIGS. 6A-6C are cross sectional views of a portion of a downhole tool 300 in various operating positions. For example, downhole tool 300 may be a fluid flow control device, a packer assembly or other downhole tool that has multiple operating positions that can be selected by shifting a moveable component relative to a stationary component. In the illustrated embodiment, tool 300 includes an outer housing 302 that may be securably coupled within a tubular string such as completion string 24 discussed above or may be part of another tool such as a flow control screen discussed above. Moveably positioned to the inner diameter of outer housing 302, downhole tool 300 includes a moveable component depicted as sliding sleeve 304. Positioned within outer housing 302 is a magnetic sleeve 308 having an axial and circumferential array of magnets, including a plurality of axial layers of circumferentially distributed magnets 310, 312, 314, 316, 318, 320. The signature of the magnetic field produced by this array of magnets can be detected using magnetic field detector 136 that may be run downhole into magnetic communication with the magnetic field on service string 138. In the illustrated embodiment, magnetic field detector 136 includes two magnetic field detector elements or sensors 140, 142, each of which is operable to independently detect the signature of the magnetic field. Preferably, each of the magnets in each of the axial layers of magnets 310, 312, 314, 316, 318, 320 has the same polarity. Also, in the illustrated embodiment, all of the magnets in the array of magnets are oriented to have the same N-S polarity.

Figure 7A:
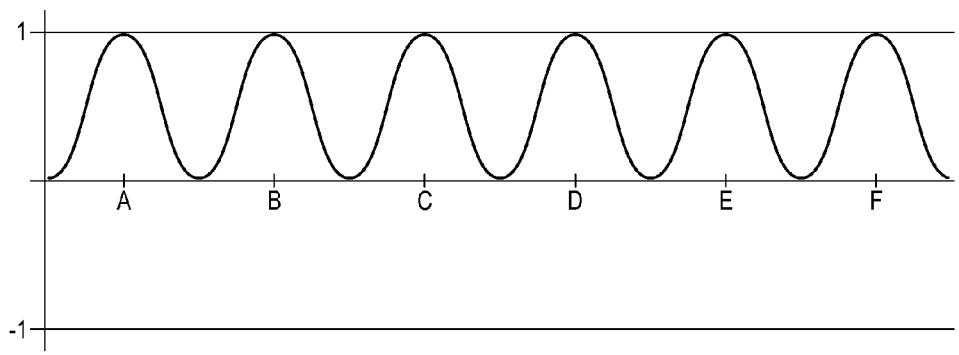
FIGS. 7A-7C are graphs of a magnetic signature obtained using a magnetic system for determining the operating position of a tool in a wellbore according to an embodiment of the present disclosure.
Figure 7B:
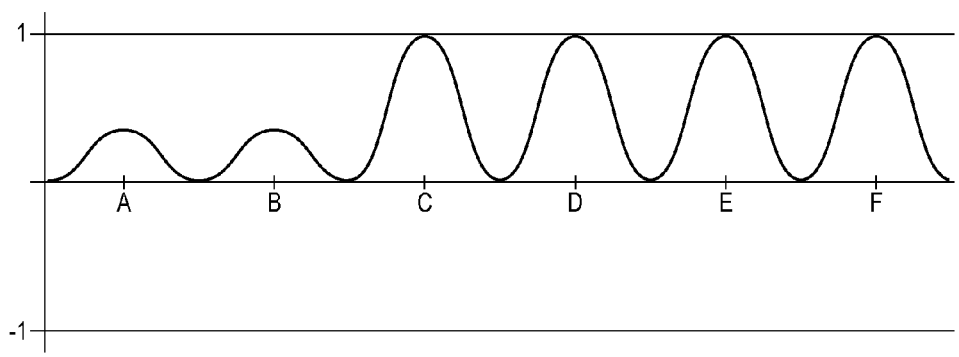
Figure 7C:
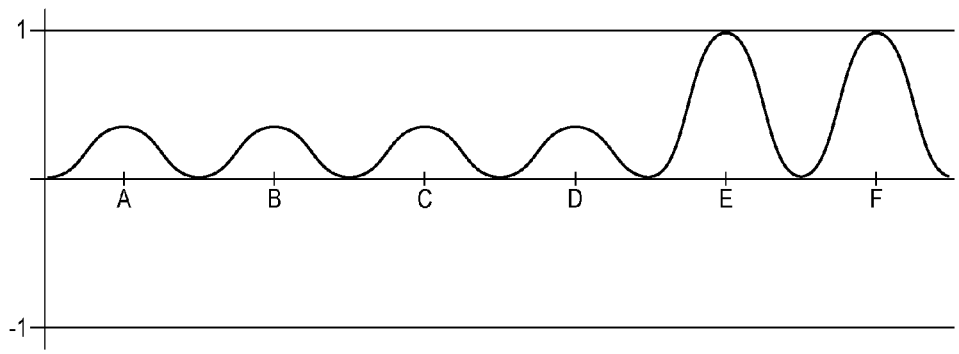

In this configuration of magnets, when magnetic field detector 136 is moved in the downhole direction through the magnetic field generated by the array of magnets in FIG. 6A, each of the magnetic field detector elements 140, 142 may detect a magnetic signature similar to that depicted in FIG. 7A, wherein the vertical scale represents a magnetic field detector element output and the horizontal scale represents a magnetic field detector element position and wherein point A represents the center point location of a magnet in axial layer 310, point B represents the center point location of a magnet in axial layer 312, point C represents the center point location of a magnet in axial layer 314, point D represents the center point location of a magnet in axial layer 316, point E represents the center point location of a magnet in axial layer 318, and point F represents the center point location of a magnet in axial layer 320. After downhole tool 300 is operated to the position depicted in FIG. 6B, the material of sliding sleeve 304 now interferes with the magnetic field generated by axial layers of magnets 310, 312. In this configuration, when magnetic field detector 136 is moved in the downhole direction through the magnetic field, each of the magnetic field detector elements 140, 142 may detect a magnetic signature similar to that depicted in FIG. 7B. After downhole tool 300 is operated to the position depicted in FIG. 6C, the material of sliding sleeve 304 now interferes with the magnetic field generated by axial layers of magnets 310, 312, 314, 316. In the configuration, when magnetic field detector 136 is moved in the downhole direction through the magnetic field, each of the magnetic field detector elements 140, 142 may detect a magnetic signature similar to that depicted in FIG. 7C.

Comparing the detected magnetic signatures depicted in FIGS. 6A-6C, the operating position of downhole tool 300 can be determined based upon the detected magnetic signature. In addition, if desired, the identity of downhole tool 300 can determined using, for example, axial layers of magnets 318, 320 in a manner described above with reference to FIGS. 2A-4C or axial layer of magnets 320 in a manner described above with reference to FIGS. 5A-5D and by rotating element 142 relative to axial layer of magnets 320.

Figure 8A:
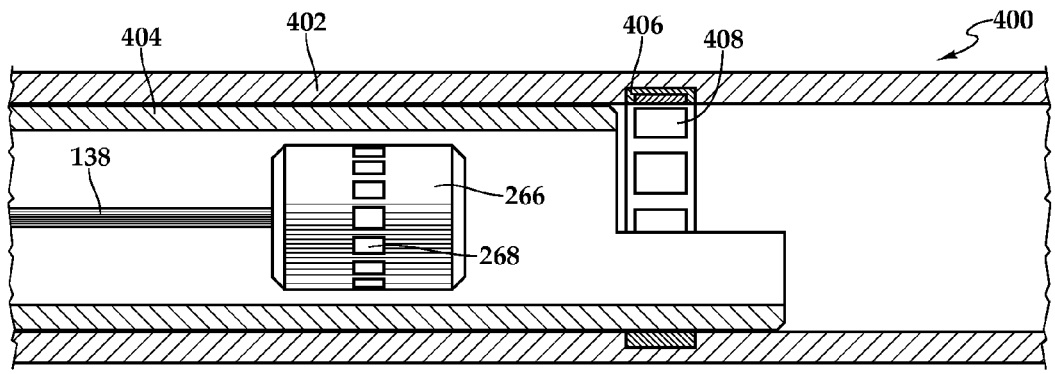
FIGS. 8A-8B are cross sectional views of a portion of a downhole tool in various operating positions, respectively, including an array of magnets for use in a magnetic system for determining the operating position of a tool in a wellbore according to an embodiment of the present disclosure.
Figure 8B:
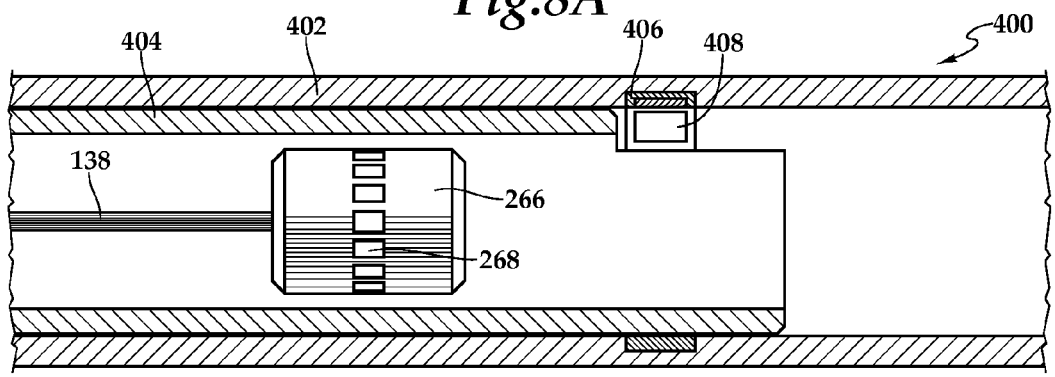

FIGS. 8A-8B are cross sectional views of a portion of a downhole tool 400 in various operating positions. For example, downhole tool 400 may be a fluid flow control device, a packer assembly or other downhole tool that has multiple operating positions that can be selected by rotating a moveable component relative to a stationary component. In the illustrated embodiment, tool 400 included an outer housing 402 that may be securably coupled within a tubular string such as completion string 24 discussed above or may be part of another tool such as a flow control screen discussed above. Moveably positioned to the inner diameter of outer housing 402, downhole tool 400 includes a moveable component depicted as rotating sleeve 404. Positioned within outer housing 402 is a magnetic sleeve 406 having a partial circumferential array of magnets 408 including, for example, seven magnets positioned circumferentially about an upper portion of magnetic sleeve 406. The signature of the magnetic field produced by this array of magnets can be detected using magnetic field detector 266 that may be run downhole into magnetic communication with the magnetic field on service string 138. In the illustrated embodiment, magnetic field detector 266 includes twelve magnetic field detector elements or sensors 268 that are operable to detect the signature of the magnetic field.

Figure 9A:
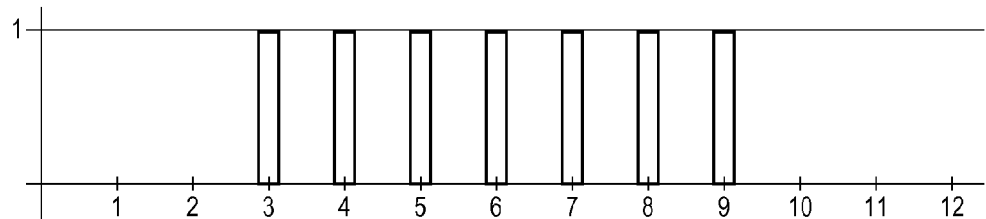
FIGS. 9A-9B are graphs of a magnetic signature obtained using a magnetic system for determining the operating position of a tool in a wellbore according to an embodiment of the present disclosure.
Figure 9B:
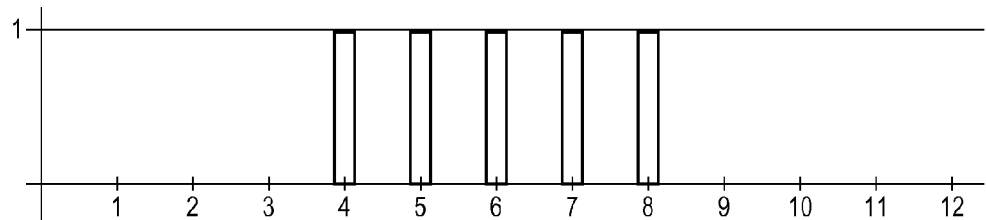

In this configuration of magnets, when magnetic field detector 266 is moved in the downhole direction through the magnetic field generated by array of magnets 408 in FIG. 8A, seven of the twelve magnetic field detector elements 268 may detect a magnetic signature similar to that depicted in FIG. 9A, wherein the vertical scale represents a magnetic field detector element output and the horizontal scale represents a particular magnetic field detector element. After downhole tool 400 is operated to the position depicted in FIG. 8B, the material of rotating sleeve 404 now interferes with a portion of the magnetic field. In this configuration, when magnetic field detector 266 is moved in the downhole direction through the magnetic field, five of the twelve magnetic field detector elements may detect a magnetic signature similar to that depicted in FIG. 9B. Comparing the detected magnetic signatures depicted in FIGS. 8A-8B, the operating position of downhole tool 400 can be determined based upon the detected magnetic signature. In addition, if desired, the identity of downhole tool 400 can determined using a magnetic sleeve having additional axial layer using, for example, the technique described above with reference to FIGS. 5A-5D.

It should be understood by those skilled in the art that the illustrative embodiments described herein are not intended to be construed in a limiting sense. Various modifications and combinations of the illustrative embodiments as well as other embodiments will be apparent to persons skilled in the art upon reference to this disclosure. It is, therefore, intended that the appended claims encompass any such modifications or embodiments.

What is claimed is:

1. A magnetic system for determining an operating position of a downhole tool positioned in a wellbore, the system comprising:
   an array of magnets operably associated with a stationary component of the downhole tool, the array of magnets including a digital address identifying array of magnets and a position determining array of magnets each operable to produce a magnetic field;
   a moveable component of the downhole tool having at least first and second positions relative to the stationary component of the downhole tool; and a magnetic field detector operable to be run into the wellbore and moved relative to the downhole tool;
   wherein, in the first position, the moveable component has a first degree of interference with the magnetic field of the position determining array of magnets;
   wherein, in the second position, the moveable component has a second degree of interference with the magnetic field of the position determining array of magnets;
   wherein the magnetic field of the digital address identifying array of magnets is significantly unchanged by the position of the moveable component; and
   wherein, the position of the moveable component relative to the stationary component is determined by detection of a magnetic signature produced by the moveable component and the array of magnets with the magnetic field detector, thereby determining the operating position of the downhole tool.

2. The system as recited in claim 1 wherein the moveable component moves axially relative to the stationary component.

3. The system as recited in claim 1 wherein the moveable component moves circumferentially relative to the stationary component.

4. The system as recited in claim 1 wherein the array of magnets further comprises an axially distributed array of magnets.

5. The system as recited in claim 1 wherein the array of magnets further comprises a circumferentially distributed array of magnets.

6. The system as recited in claim 1 wherein the array of magnets further comprises an axially and circumferentially distributed array of magnets.

7. The system as recited in claim 1 wherein the digital address identifying array further comprises a circumferentially distributed array of magnets having a single axial layer and wherein the position determining array of magnets further comprises an axially distributed array of magnets.

8. The system as recited in claim 1 wherein the moveable component further comprises a plurality of positions relative to the stationary component between the first and second positions and wherein a different degree of interference with the magnetic field is produced in each of the plurality of positions.

9. The system as recited in claim 1 wherein the magnetic field detector further comprises at least two magnetic field detector elements each operable to detect the magnetic signature produced by the moveable component and the array of magnets.

10. A magnetic method for determining an operating position of a downhole tool positioned in a wellbore, the method comprising:
    providing the downhole tool in the wellbore, the downhole tool including a stationary component having an array of magnets operably associated therewith and a moveable component having at least first and second positions relative to the stationary component;
    producing a magnetic field with the array of magnets;
    generating a first degree of interference with the magnetic field when the moveable component is in the first position relative to the stationary component;
    generating a second degree of interference with the magnetic field when the moveable component is in the second position relative to the stationary component;
    running a magnetic field detector into the wellbore;
    moving the magnetic field detector through at least a portion of the downhole tool;
    detecting a magnetic signature produced by the moveable component and the array of magnets with the magnetic field detector;
    determining a position of the moveable component relative to the stationary component based upon the magnetic signature; and
    identifying a digital address of the downhole tool based on a portion of the magnetic signature that is significantly unchanged by the position of the moveable component.

11. The method as recited in claim 10 further comprising axially shifting the movable component relative to the stationary component.

12. The method as recited in claim 10 further comprising rotatably shifting the movable component relative to the stationary component.

13. The method as recited in claim 10 wherein producing the magnetic field with the array of magnets further comprises producing the magnetic field with an axially distributed array of magnets.

14. The method as recited in claim 10 wherein producing the magnetic field with the array of magnets further comprises producing the magnetic field with a circumferentially distributed array of magnets.

15. The method as recited in claim 10 wherein producing the magnetic field with the array of magnets further comprises producing the magnetic field with an axially and circumferentially distributed array of magnets.

16. The method as recited in claim 10 wherein the portion of the magnetic signature that is significantly unchanged by the position of the moveable component is generated by a circumferentially distributed array of magnets having a single axial layer and wherein determining the position of the moveable component relative to the stationary component based upon the magnetic signature further comprises detecting a portion of the magnetic signature generated by an axially distributed array of magnets.

17. The method as recited in claim 10 further comprises generating a plurality of degrees of interference with the magnetic field when the moveable component is moved to a plurality of positions relative to the stationary component.

18. The method as recited in claim 10 wherein detecting the magnetic signature produced by the moveable component and the array of magnets with the magnetic field detector further comprises detecting the magnetic signature with at least two magnetic field detector elements.

\* \* \* \* \*